US010066551B2

(12) United States Patent
Verseux

(10) Patent No.: US 10,066,551 B2
(45) Date of Patent: Sep. 4, 2018

(54) FAIRING DEVICE FOR AIRCRAFT PROPULSION ASSEMBLY COMPRISING AN INTERNAL COMPARTMENT FITTED WITH A FAN

(71) Applicant: Airbus Operations (S.A.S.), Toulouse (FR)

(72) Inventor: Olivier Verseux, Tournefeuille (FR)

(73) Assignee: Airbus Operations (S.A.S.), Toulouse (FR)

( * ) Notice: Subject to any disclaimer, the term of this patent is extended or adjusted under 35 U.S.C. 154(b) by 976 days.

(21) Appl. No.: 14/485,158

(22) Filed: Sep. 12, 2014

(65) Prior Publication Data

US 2015/0267616 A1      Sep. 24, 2015

(30) Foreign Application Priority Data

Sep. 19, 2013   (FR) ..................................... 13 59028

(51) Int. Cl.
| | |
|---|---|
| *F02C 7/18* | (2006.01) |
| *B64D 33/08* | (2006.01) |
| *F02C 7/32* | (2006.01) |
| *B64D 33/02* | (2006.01) |

(52) U.S. Cl.
CPC ............... *F02C 7/18* (2013.01); *B64D 33/08* (2013.01); *F02C 7/32* (2013.01); *B64D 2033/024* (2013.01); *B64D 2033/0286* (2013.01); *F05D 2260/608* (2013.01)

(58) Field of Classification Search
CPC ... F02C 7/32; F02C 7/18; B64D 33/08; B64D 29/00; B64D 13/006; B64D 13/02; B64D 2033/024; B64D 2033/0286; F02K 1/822; F05D 2260/608

See application file for complete search history.

(56) References Cited

U.S. PATENT DOCUMENTS 2,268,183  A  *  12/1941  Ettore Bugatti ....... B64D 33/10
                                                            244/57
2,578,481  A     12/1951  Lombard
4,525,995  A  *   7/1985  Clark ..................... F01D 25/18
                                                           184/6.11

(Continued)

FOREIGN PATENT DOCUMENTS

| DE | 35 12 714 | 10/1986 |
|---|---|---|
| EP | 2 607 658 | 6/2013 |
| WO | WO 2010/136710 | 12/2010 |

OTHER PUBLICATIONS

French Search Report for Application No. 13 59 028 dated May 13, 2014.

*Primary Examiner* — Carlos A Rivera
(74) *Attorney, Agent, or Firm* — Jenkins, Wilson, Taylor & Hunt, P.A.

(57) ABSTRACT

Ventilation of an internal compartment of a fairing device of a propulsion assembly in an aircraft moving at low speed on the ground or when it is stopped cannot be provided optimally using a conventional dynamic air intake. To solve this problem, the use of a fan housed within the internal compartment is proposed, for which the fan propeller can alternately be coupled to an accessory gear box to drive the fan propeller, and uncoupled from the accessory gear box when it is unnecessary to drive the fan propeller or when it represents a danger.

15 Claims, 5 Drawing Sheets

(56) References Cited

U.S. PATENT DOCUMENTS

| | | | | |
|---|---|---|---|---|
| 4,773,212 | A * | 9/1988 | Griffin | F02C 7/224 60/226.1 |
| 5,012,639 | A * | 5/1991 | Ream | B64D 29/00 60/226.1 |
| 5,357,742 | A * | 10/1994 | Miller | B64D 33/08 60/785 |
| 5,743,493 | A * | 4/1998 | McCaughan | B64C 21/025 244/130 |
| 5,987,877 | A * | 11/1999 | Steiner | B64D 33/10 60/39.08 |
| 6,202,403 | B1 | 3/2001 | Laborie et al. | |
| 6,282,881 | B1 * | 9/2001 | Beutin | B64D 33/10 184/6.11 |
| 6,851,255 | B2 * | 2/2005 | Aitchison | F01D 25/12 137/521 |
| 7,665,310 | B2 * | 2/2010 | Laborie | F01D 9/06 60/782 |
| 2007/0277532 | A1 * | 12/2007 | Talan | F02C 3/113 60/792 |
| 2009/0302152 | A1 * | 12/2009 | Knight | B64D 41/00 244/58 |
| 2009/0314004 | A1 * | 12/2009 | Van Der Woude | B64D 33/10 60/785 |

* cited by examiner

FAIRING DEVICE FOR AIRCRAFT PROPULSION ASSEMBLY COMPRISING AN INTERNAL COMPARTMENT FITTED WITH A FAN

TECHNICAL FIELD

This disclosure relates to an aircraft propulsion assembly including at least one fairing device and is particularly applicable to cooling of a defined compartment inside such a fairing device.

The disclosure is indifferently applicable to propulsion assemblies comprising a turbojet and propulsion assemblies comprising a turboprop or propulsion assemblies comprising an open rotor type turbojet.

More precisely, the fairing device according to the disclosure may be of the type delimiting the external boundary of a bypass flow channel of a double flow turbojet, or of the type separating the bypass flow channel and the core of a double flow turbojet, or of the type delimiting the external boundary of a turboprop or an open rotor turbojet.

The disclosure also relates to an aircraft on which such a propulsion assembly is installed, as well as a method of ventilating an internal compartment in a fairing device of such a propulsion assembly.

BACKGROUND

In a propulsion assembly in which the turbine engine is a turbojet, the external fairing device that surrounds the turbojet usually comprises an outer annular wall or envelope and an inner annular wall or envelope. The outer annular wall forms an external fairing along which the relative wind flows during flight, while the inner annular wall will guide an air flow supplying the turbine engine. In the case of a double flow turbojet, the air flow directed by the inner annular wall is the bypass flow propelled by the fan and that flows in the downstream direction around the turbojet core.

FIG. 1 is a partial axial sectional view of a propulsion assembly 10 of a known type of aircraft, comprising a double flow turbojet 12 and an external fairing device 14 surrounding this turbojet.

As shown in this figure, the outer annular wall 16 surrounds the propulsion assembly 10 so as to guide relative wind 18 around the propulsion assembly while the inner annular wall 20 directs the air flow 22 penetrating in the propulsion assembly at the upstream end, and the bypass flow stream 24 originating from the above mentioned air flow 22 and flowing around the core 26 of the turbojet 12 at the downstream end.

Throughout this description, the "upstream" and "downstream" directions are defined relative to the global gas flow direction in the turbine engine and the terms "forward" and "aft" should be considered relative to a direction of motion F of the aircraft under the effect of the thrust applied by the turbojet 12, this direction being parallel to a longitudinal axis 72 of the turbojet.

The outer 16 and inner 20 annular walls delimit an internal compartment 28 between them in the external fairing device 14 also called the "fan compartment" because of its position adjacent to the fan 30, between an air intake 32 and a thrust inverter 34.

In general, the outer wall 16, an upstream portion of the inner wall 20 corresponding to the air intake 32 and a downstream portion of the inner wall 20 corresponding to the thrust inverter 34, form part of a nacelle of the propulsion assembly 10. On the other hand, an intermediate portion of the inner wall 20 that delimits the internal compartment 28 forms part of an intermediate casing 35 fixed to the turbojet core 26.

The internal compartment 28 usually contains an accessory control box 36 also called the AGB (Accessory Gear Box) that mechanically connects a rotor 38 of the turbine engine to one or several accessories such as a starter. In the example shown, the rotor 38 concerned is a high pressure compressor rotor and is connected to the AGB 36 through an intermediate shaft 40 extending from the turbojet core 26 as far as the internal compartment 28.

Furthermore, the internal compartment 28 is usually used to house one or several systems such as an Engine Control Unit (ECU), although none of these systems are shown in the sectional plane in FIG. 1.

Some of these systems usually require cooling in order to operate satisfactorily.

Furthermore, safety standards impose that the concentration of inflammable vapours in the air inside the internal compartment 28 should not exceed a predefined maximum level, such that the internal compartment must be ventilated. "Ventilation" means that the air must be renewed regularly within the internal compartment 28.

The external fairing device 14 usually comprises an air inlet orifice 42 and an air exhaust orifice 43 formed in the outer wall 16, to ventilate the internal compartment 28 and to cool any systems contained in it. The two orifices 42 and 43 are usually diametrically opposite as shown in FIG. 1. Furthermore, the air inlet orifice 42 is usually arranged close to the upstream end of the internal compartment 28 while the exhaust orifice is typically arranged close to the downstream end of the internal compartment 28.

At the air inlet orifice 42, the outer wall 16 is usually profiled so as to form a dynamic air intake. To achieve this, the upstream edge 44 of the air inlet orifice 42 may for example be curved inwards into the internal compartment 28 as shown in FIG. 1 to form an air intake of the type typically referred to as "NACA", to facilitate penetration of the air boundary layer circulating along the outer wall 16, in the air inlet orifice 42. As a variant or as a complement, the downstream edge of the air inlet orifice 42 may be convex outwards to form a scoop, which also facilitates sampling of air circulating along the outer wall 16. As a variant, such a scoop may be formed from an add-on part on the outer wall 16, the add-on part facing the air inlet orifice 42.

The air flow that enters the internal compartment 28 then forms a ventilation flow 46 circulating in the internal compartment and that finally goes out through the air exhaust orifice 43.

However, the cooling efficiency of the internal compartment 28 then depends on the speed of the relative wind 18 surrounding the external fairing device 14 and therefore the aircraft advance speed.

Thus, when the aircraft moves at low ground speed or is stopped, the above-mentioned dynamic air intake becomes inoperative and the internal compartment 28 of the external fairing device 14 is only cooled by natural convection through the air inlet orifice 42 and the air exhaust orifice 43, but this may be insufficient.

One solution for providing satisfactory ventilation and cooling whenever possible under these low speed conditions consists of oversizing the air inlet 42 and air exhaust 43 orifices, and/or exaggerating the aerodynamic profile of the outer wall 20 at the edge of the air inlet orifice 42, so as to increase the ventilation flow 46.

However, this solution penalises the aerodynamic drag of the propulsion assembly, particularly due to an increase in the ram drag during flight, and particularly during the cruise phase.

Furthermore, if a fire occurs in the internal compartment 28, the circulation of relatively large ventilation air flow 46 is not desirable because this increases the oxygen content in the air inside the internal compartment, which may make it more difficult to put the fire out. The external fairing devices are usually equipped with a fire fighting system designed to output an extinguishing agent within the internal compartment 28. The relatively large ventilation air flow then makes it necessary to oversize the fire fighting system so that it will be capable of maintaining a sufficient concentration of extinguishing agent inside the internal compartment 28 in case of fire.

In general, in the case of a fire, the ventilation air flow 46 in the internal compartment 28 cannot be interrupted or at least reduced, which tends to reduce the efficiency of the extinguishing agent.

Furthermore, in double flow turbojets, as shown in FIG. 1, the bypass flow 24 is separated from the turbojet core 26 by an internal fairing device 48 comprising an outer wall 50 and an inner wall 52 together delimiting an internal compartment 54, typically called the "core compartment". The outer wall 50 is sometimes called the IFS (Inner Fixed Structure).

In order to limit the concentration of inflammable vapours, this internal compartment 54 also has to be ventilated, which is usually done by an air inlet orifice 56 usually on the upstream side and an air exhaust orifice 58 usually on the downstream side. These orifices 56 and 58 carry the circulation of a ventilation air flow 60 inside the internal compartment 54. The orifices 56 and 58 are preferably diametrically opposite each other.

In particular, the air exhaust orifice 58 is preferably arranged downstream from a downstream end 62 of the external fairing device 14 such that the air pressure circulating along the outer wall 50 of the internal fairing device 48 at the air exhaust orifice 58 is as low as possible. As a variant, the air exhaust orifice 58 may communicate with a channel passing through an arm connected to the external fairing device 14 and opening up on the outside of the propulsion assembly through the outer wall 16 of the external fairing device 14.

The air inlet orifice 56 may be in the form of a dynamic intake provided that the outer wall 50 is given an appropriate conformation, as explained above concerning the external fairing device 14.

Furthermore, circulation of the ventilation flow 60 in the internal compartment 54 also provides a way of cooling any systems housed within this compartment, if necessary.

However, the ventilation flow 60 passing through the internal compartment 54 of the internal fairing device 48 may be insufficient, particularly in turbojets with high dilution ratios.

However, the solution consisting of oversizing the air inlet 56 and air exhaust 58 orifices penalises the performances of the turbojet and also has the disadvantages described above concerning the risk of fire.

Similar problems arise concerning the fairing device surrounding the core of a turboprop or an open rotor turbojet.

SUMMARY

A purpose of the disclosure is particularly to provide a simple, economic and efficient solution to at least part of these problems, at least partly avoiding the above mentioned disadvantages.

One particular purpose of the disclosure is to provide a solution to these problems that consumes little energy and that has all the guarantees necessary for safety.

To achieve this, the disclosure proposes a propulsion assembly for an aircraft comprising a turbine engine in which the turbine engine comprises a rotor and is equipped with an accessory gear box comprising at least one gear mechanically coupled to the rotor. The propulsion assembly also comprises a fairing device comprising an outer annular wall and an inner annular wall that together delimit an internal compartment fitted with an air inlet orifice and an air exhaust orifice.

According to the disclosure, the propulsion assembly comprises at least one fan unit housed in the internal compartment and comprising a fan propeller and coupling and uncoupling structure for coupling and uncoupling the fan propeller and the gear.

The fan makes it possible to cool the internal compartment even when the aircraft is moving at low speed on the ground or when it is stopped.

The disclosure thus limits the dimensions necessary for the air inlet orifice formed in the outer wall of the fairing device.

In particular, this makes it easier to extinguish a fire within the internal compartment. This helps limiting the required sizing of a fire fighting system that can be installed on the fairing device.

The disclosure also makes the presence of a dynamic air intake for air inlet superfluous. This also contributes to reducing the ram drag of the fairing device.

In particular, the lack of a scoop projecting at the air inlet orifice can also reduce the risk of ice formation at this orifice.

The disclosure also helps reducing the design constraints as regards the position of the air inlet orifice.

The fan propeller and gear coupling and uncoupling structure help to couple and uncouple these two elements and therefore to start and stop the fan propeller when required.

In particular, this avoids the need to draw off mechanical energy from the accessory gear box to drive the fan propeller when operation of the fan is not necessary for cooling and ventilation of the internal compartment in which this fan is installed.

The coupling and uncoupling structure advantageously include a first shaft fixed in rotation to the fan propeller, a second shaft fixed in rotation to the gear of the accessory gear box, and an electromagnetic clutch connecting the first shaft and the second shaft to each other.

In a first preferred embodiment of the disclosure, the turbine engine is a double flow turbojet (also called "turbofan" or "ducted fan turbine engine"), the outer annular wall forms an external fairing of the turbine engine, and the inner annular wall delimits an annular channel for the bypass air flow of the turbine engine.

In other words, relative wind flowing around the turbine engine is adjacent to the outer annular wall, while the bypass air flow is adjacent to the inner annular wall.

In this case, the internal compartment is preferably located axially between an air intake and a thrust inverter that forms part of the fairing device.

In a second preferred embodiment of the disclosure, the turbine engine is a double flow turbojet, the outer annular wall delimits an annular flow channel of a bypass air flow of the turbine engine, and the inner annular wall delimits a core of the turbine engine.

In other words, the bypass air flow is adjacent to the outer annular wall, while the inner annular wall surrounds the turbine engine core. Some portions of the inner annular wall may delimit an annular flow channel from a core air flow in the turbine engine.

In a third preferred embodiment of the disclosure, the turbine engine is a single flow turbojet or an open rotor turbofan or a turboprop, the outer annular wall forms an external fairing of the turbine engine and the inner annular wall delimits a core of the turbine engine.

In other words, the relative wind flowing around the turbine engine is adjacent to the outer annular wall, while the inner annular wall surrounds the turbine engine core. Some portions of the inner annular wall may delimit an annular flow channel for an air flow inside the turbine engine.

In general, the propulsion assembly advantageously comprises a control unit to control the coupling and uncoupling structure.

The control unit is preferably electrically connected to the coupling and uncoupling structure so as to enable electrical control of these means.

The propulsion assembly advantageously comprises measurement structure configured to measure the air temperature within the internal compartment and to provide the result of this measurement to the control unit. Furthermore, the control unit is preferably configured such that the fan propeller and the gear of the accessory gear box are uncoupled when the temperature measured by the measurement structure is less than a predetermined temperature threshold, and such that the fan propeller and the gear of the accessory gear box are coupled when the temperature measured by the measurement structure is greater than the predetermined temperature threshold.

Thus, the ventilation may be started as soon as the temperature measured in the compartment reaches the above mentioned temperature threshold.

The propulsion assembly advantageously can provide information about the rotation speed of the rotor to the control unit, and the control unit is preferably configured such that the fan propeller and the gear of the accessory gear box are uncoupled when the rotation speed of the rotor is greater than a predetermined speed threshold, such that the fan propeller and the gear of the accessory gear box are coupled when the rotation speed of the rotor is less than the predetermined speed threshold.

Thus, ventilation may be started as soon as the rotation speed of the rotor drops below the above-mentioned speed threshold. Such a situation may correspond to a low speed aircraft displacement phase justifying activation of the ventilation.

If the propulsion assembly comprises the above mentioned measurement structure and also is equipped and adapted to provide the above mentioned information, the control unit is preferably configured such that the fan propeller and the gear of the accessory gear box are uncoupled when the temperature measured by the measurement structure is less than the predetermined temperature threshold and the rotation speed of the rotor is greater than the predetermined speed threshold, and such that the fan propeller and the gear are coupled when the temperature measured by the measurement structure is greater than the predetermined temperature threshold, or the rotation speed of the rotor is less than the predetermined speed threshold.

The disclosure also relates to an aircraft, comprising at least one propulsion assembly of the type disclosed above.

Finally, the disclosure relates to a method of ventilating an internal compartment in a fairing device of a propulsion assembly of the type disclosed above, including coupling of the fan propeller and the gear such that the gear drives the fan propeller so as to generate a ventilation air flow, and the method further including later uncoupling of the fan propeller and the gear such that the gear no longer drives the fan propeller.

If the propulsion assembly includes the control unit and the measurement structure, the method preferably includes coupling of the fan propeller and the gear of the accessory gear box when the temperature measured by the measurement structure is greater than the predetermined temperature threshold, and uncoupling of the fan and the gear when the temperature measured by the measurement structure is less than the predetermined threshold.

If the propulsion assembly includes the control unit and is configured to provide the information noted, the method preferably includes coupling of the fan propeller and the gear of the accessory gear box when the rotation speed of the rotor is less than the predetermined speed threshold, and uncoupling of the fan propeller and the gear when the rotation speed of the rotor is greater than the predetermined speed threshold.

Finally, if the propulsion assembly comprises the above mentioned measurement structure and also configured to provide the above mentioned information, the method preferably includes uncoupling of the fan propeller and the gear when the temperature measured by the measurement structure is less than the predetermined temperature threshold and the rotor rotation speed is greater than the predetermined speed threshold, and coupling of the fan propeller and the gear when the temperature measured by the measurement structure is greater than the predetermined temperature threshold or the rotor rotation speed is less than the predetermined speed threshold.

BRIEF DESCRIPTION OF THE DRAWINGS

The disclosure will be better understood and other details, advantages and characteristics of the disclosure will appear clear after reading the following description given as non-limitative examples with reference to the appended drawings, in which.

In these figures, identical references may refer to identical or similar elements.

DETAILED DESCRIPTION

Figure 1:
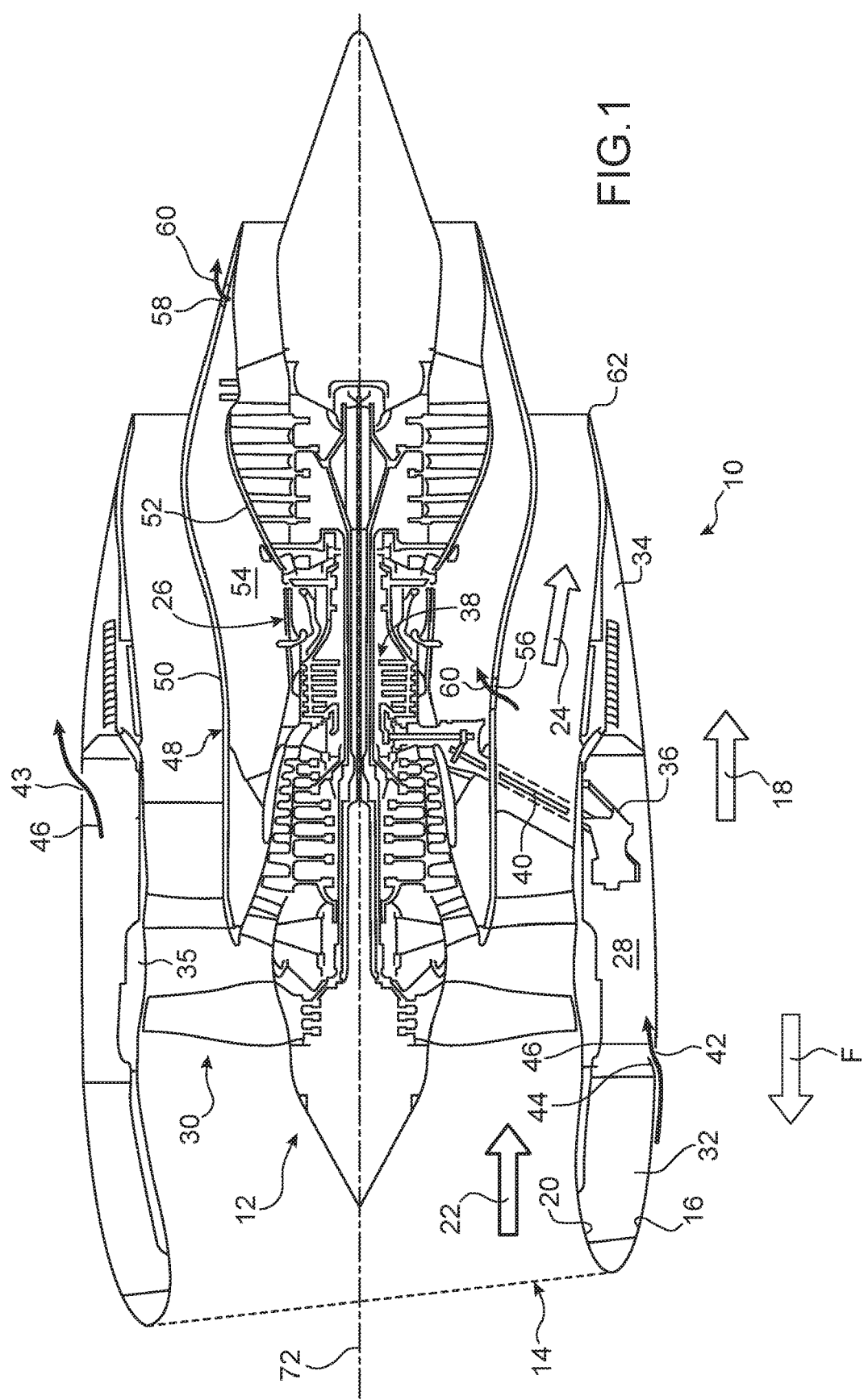
FIG. 1 described above is a partial diagrammatic axial sectional view of a known type of propulsion assembly.
Figure 2:
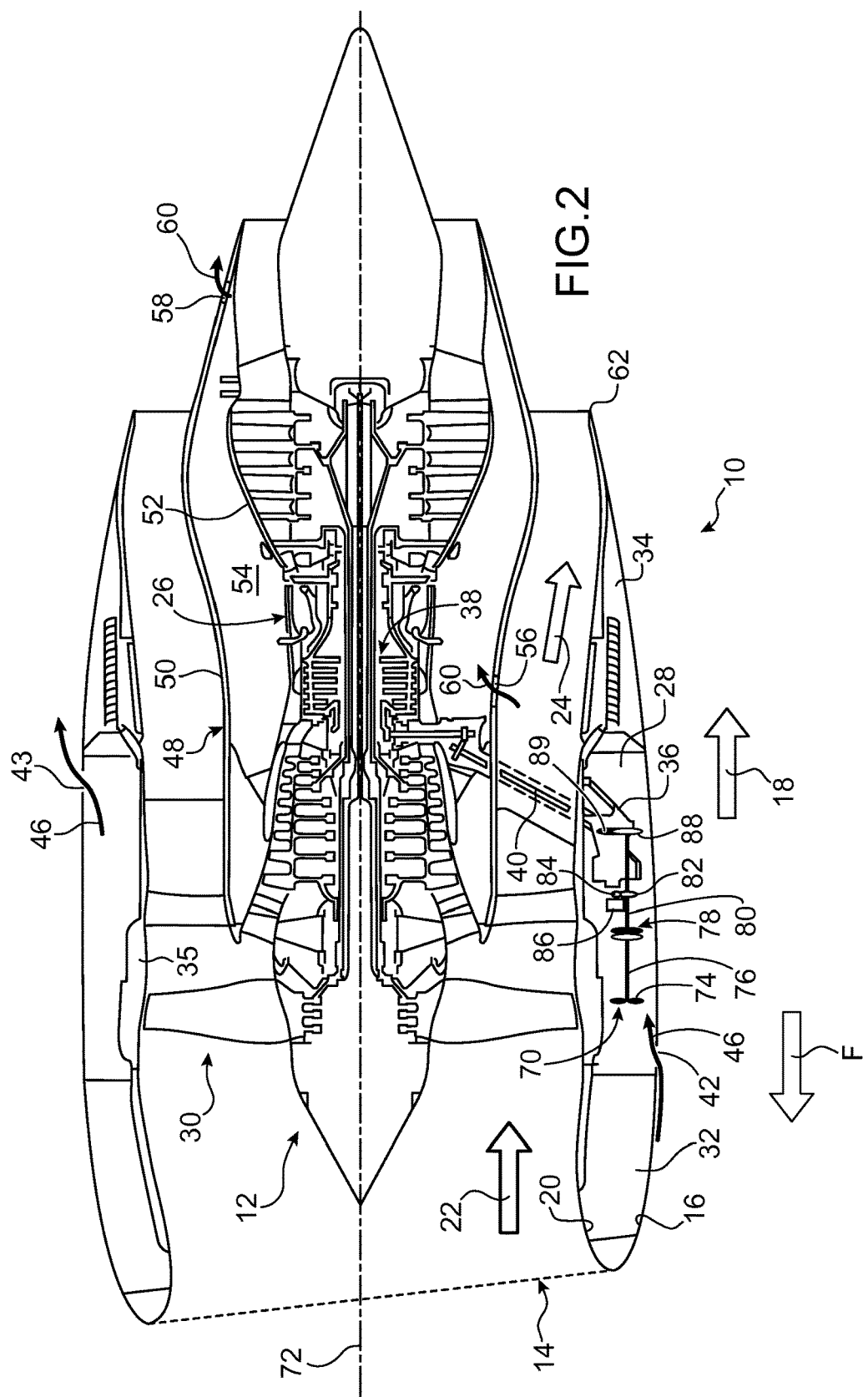
FIG. 2 is a partial diagrammatic axial sectional view of a propulsion assembly according to a first preferred embodiment of the disclosure.

FIG. 2 shows a propulsion assembly 10 according to a first embodiment of the disclosure similar to that in FIG. 1, but in which a fan 70 is housed in the internal compartment 28 of the external fairing device 14, aft from the air inlet orifice 42.

The fan 70 comprises a fan propeller 74, a first shaft 76 fixed to the fan propeller 74, an electromagnetic clutch 78, a second shaft 80 carrying a first gear 82 engaged with a rotor shaft 84 of an electric motor 86 and a second gear 88 engaged with a gear 89 forming part of the accessory gear box 36 and driven in rotation by the intermediate shaft 40.

The first shaft 76, the electromagnetic clutch 78, the second shaft 80 and the second gear 88 form "coupling and uncoupling structure" for coupling and uncoupling the fan propeller 74 and the gear 89 of the accessory gear box 36, in the terminology of the disclosure.

Figure 2A:
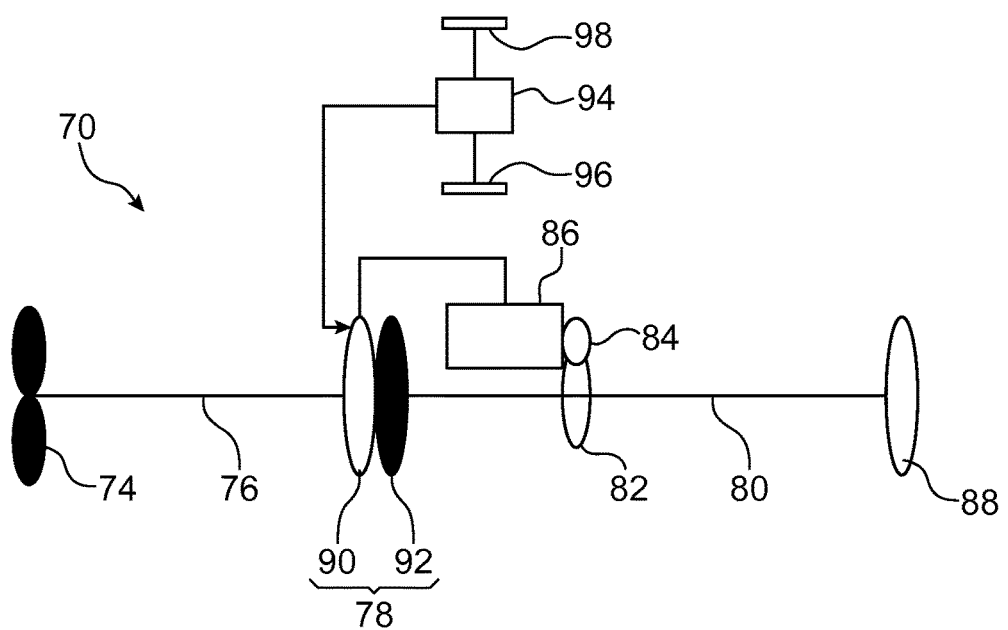
FIG. 2a is a larger scale view of a fan forming part of a fairing device of the propulsion assembly in FIG. 2.

The electromagnetic clutch 78, very diagrammatically shown in FIG. 2a, comprises a first rotating part 90 fixed in rotation to the first shaft 76, and a second rotating part 92 fixed in rotation to the second shaft 80. In a manner known in itself, the electromagnetic clutch 78 includes electrical control for alternatively coupling and uncoupling the two rotating parts 90 and 92. More precisely, the two rotating parts 90 and 92 are coupled by being forced towards each other, under the effect of a return force, preferably a mechanical force, until they come into contact with each other so as to rotate at unison. Conversely, the two rotating parts 90 and 92 are uncoupled by being forced away from each other, under the effect of a magnetic force in opposite direction, until the two rotating parts are no longer fixed to each other in rotation.

The electric motor 86 is used as a source of electric current to control the electromagnetic clutch 78. To achieve this, the rotor shaft 84 of the electric motor 86 is driven in rotation by the first gear 82 carried by the second shaft 80 so as to induce an electric current powering the electromagnetic clutch 78.

As a variant, the electric motor may be integrated into the second shaft 80. In other words the rotor of the electric motor may be formed directly by the second shaft 80. In such case the stator of the electric motor surrounds this second shaft 80.

As another variant, the electromagnetic clutch 78 may be connected to a general electricity network of the turbojet powered by a main alternator of the turbojet, sometimes called IDG (Integrated Drive Generator), and possibly by an Auxiliary Power Unit (APU) of this turbojet.

The propulsion unit 10 comprises a control unit 94 capable of switching the state of the electromagnetic clutch 78 and therefore controlling rotation or stopping of the fan propeller 74 of the fan 70.

This control unit 94 may be a multi-functional unit currently called the Engine Control Unit (ECU), or as a variant an electronic unit dedicated to control of the fan 70.

In both cases, the control unit 94 is preferably coupled to measurement structure comprising a sensor 96 to measure the air temperature inside the internal compartment 28.

Furthermore, the control unit 94 is preferably coupled to the information providing portion 98 providing information about the rotation speed of the rotor 38 to the control unit 94.

This control unit 94 is configured such that the two rotating parts 90 and 92 of the electromagnetic clutch 78 are:
uncoupled when the temperature measured by the sensor 96 is less than a predetermined temperature threshold and the rotation speed of the rotor 38 provided by the information providing portion 98 is greater than a predetermined speed threshold,
coupled when the measured temperature exceeds the predetermined temperature threshold or the rotation speed of the rotor 38 is less than the predetermined speed threshold.

Thus, when the measured temperature exceeds the above mentioned temperature threshold, the fan propeller 74 of the fan 50 is driven in rotation and it increases the ventilation of the internal compartment 28 by forced convection and therefore improves cooling of the systems contained inside the internal compartment 28. The same applies when the rotation speed of the rotor 38 is less than the predetermined speed threshold, which can occur when the flight is in a low speed phase or is taxiing, which requires action of the fan.

On the other hand, when the measured temperature is less than the above mentioned temperature threshold and the rotation speed of the rotor 38 is greater than the predetermined speed threshold, the blade 74 of the fan 70 is not driven in rotation to limit the ram drag on the air inlet orifice 42 and the energy consumption of the fan 50.

Note that the information providing portion 98 may include a dedicated speed sensor connected to the control unit 94 to measure the rotation speed of the rotor. As a variant, the information providing portion 98 may be composed of a connection that may be connected to an electronic unit fitted on the airframe of an aircraft to receive information about the engine speed or the flight phase corresponding to the position of flight control devices installed in the cockpit. In this case the predetermined speed threshold may correspond to a minimum engine speed imposed for a given flight phase, for example the cruising phase.

Finally, the control unit 94 is configured such that under failsafe conditions, the two rotating parts 90 and 92 of the electromagnetic clutch 78 are coupled, such that the fan 70 then ventilates the internal compartment 28. To achieve this, the electromagnetic clutch 78 is designed such that if there is no electric power supply to it, its two rotating parts 90 and 92 are coupled to each other.

In operation, the internal compartment 28 may thus be ventilated by a method including:
coupling of the fan propeller 74 and gear of the accessory gear box 36, 36' when the temperature measured by the measurement structure 96 is greater than the predetermined temperature threshold or when the rotation speed of the rotor 38 provided by the information providing portion98 is less than the predetermined speed threshold, and
uncoupling of the fan propeller 74 and the gear 89, 89' when the temperature measured by the measurement structure is less than the predetermined threshold and the rotation speed of the rotor 38 is greater than the predetermined speed threshold.

The disclosure according to the first embodiment thus discloses a simple and efficient way of ventilating the internal compartment 28 of the external fairing device 14, that remains efficient when the aircraft is travelling at low speed on the ground or when it is stopped.

The disclosure can thus limit the required dimensions for the air inlet orifice 42 formed in the outer wall 16 of the external fairing device 14. In particular, this makes it easier to extinguish a fire inside the internal compartment 28 and therefore limits the size of the fire fighting system required for the external fairing device 14.

The disclosure also makes the dynamic nature of the air intake formed by the air inlet orifice 42 superfluous. In other words, the outer wall 16 does not need a profiled portion and scoop such that the air inlet orifice is essentially a static air intake. The result is a reduction in the aerodynamic drag of the external fairing device 14. The lack of a scoop also reduces the risk of ice accumulating at the air inlet orifice 42.

The disclosure can generally give better control of the ventilation air flow 46, which in particular limits the ram drag during flight.

Figure 3:
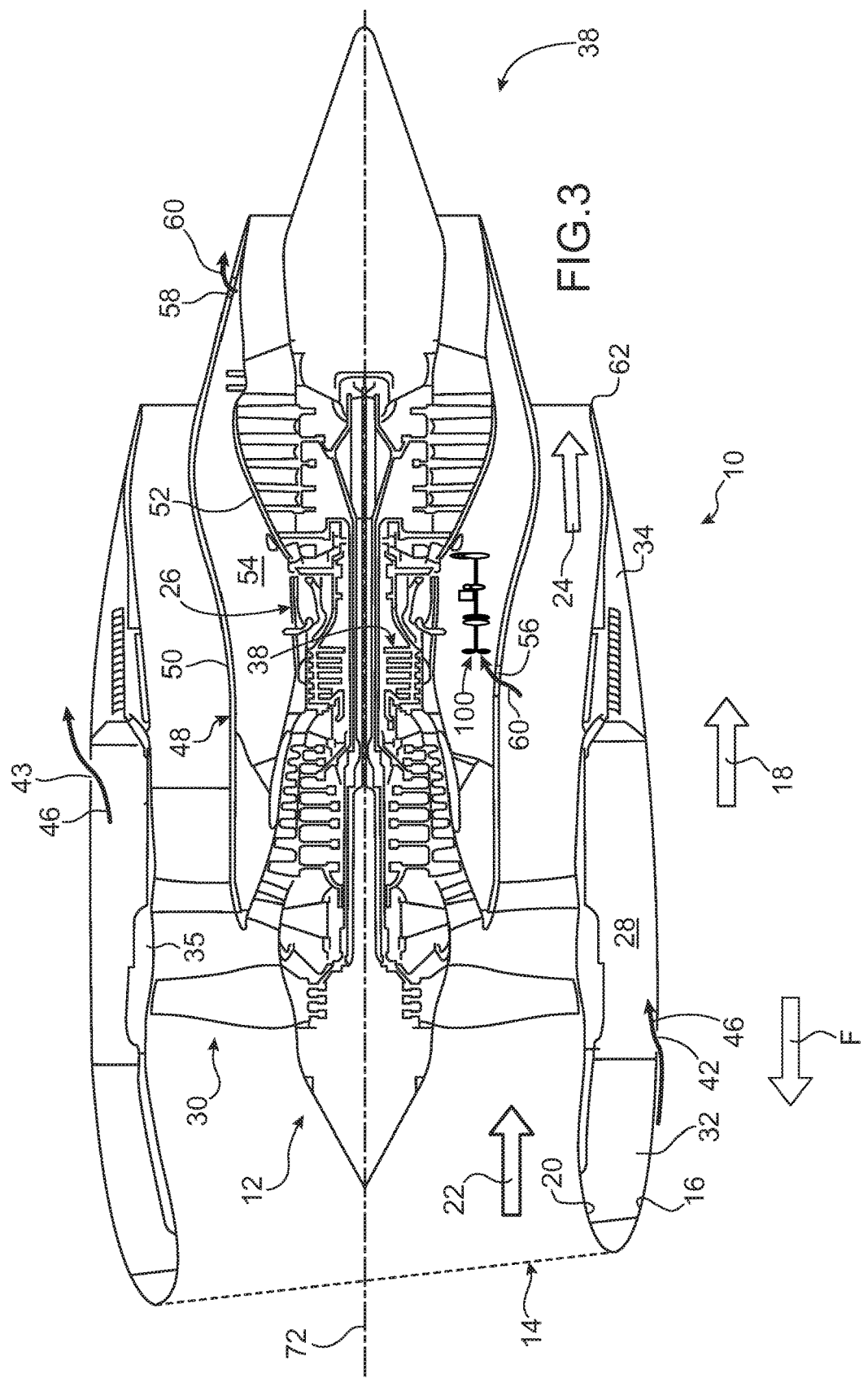
FIG. 3 is a partial diagrammatic axial sectional view of a propulsion assembly according to a second preferred embodiment of the disclosure.

FIG. 3 shows a propulsion assembly 10 according to a second embodiment of the disclosure similar to that in FIG.

1, but in which a fan 100 is housed in the internal compartment 54 of the internal fairing device 48, aft from the air inlet orifice 56 of the fairing device.

In the example shown, the fan 100 is similar to the fan 70 in FIG. 2, and is also coupled to a gear of the accessory gear box, which in this case is housed in the internal compartment 54 of the internal fairing device 48. Note that the size is reduced thanks to the circumferential offset of the fan 100 from the accessory gear box around the longitudinal axis 72 of the turbojet. Due to the offset the accessory gear box is not visible in the section plane in FIG. 3.

Operation of the fan 100 is similar to operation of the fan 70 described above.

The disclosure according to the second embodiment thus discloses a simple and efficient way of ventilating the internal compartment 54 of the internal fairing device 48, which is particularly advantageous for a turbojet with a high dilution ratio.

The disclosure according to this second embodiment also has the advantages of the first embodiment related to the fire risk, but in this case inside the internal compartment 54 of the internal fairing device 48.

Note that the two embodiments disclosed above may be combined to provide a turbojet in which each of the internal compartments 28 and 54 of the external fairing device 14 and the internal fairing device 48 respectively is provided with a fan. In both cases, the two fans may each be coupled to the compressor rotor 38 mechanically.

Figure 4:
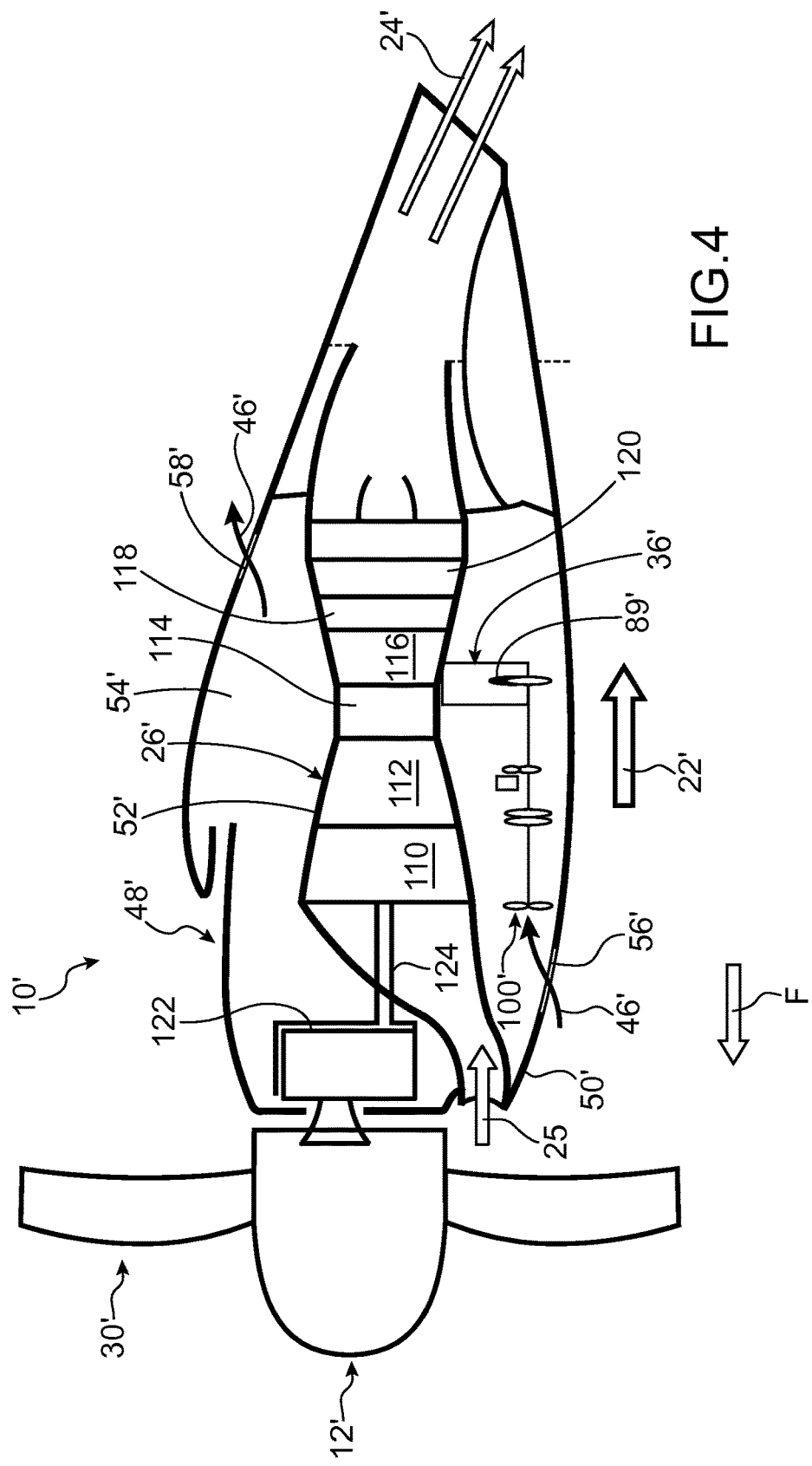
FIG. 4 is a partial diagrammatic axial sectional view of a propulsion assembly according to a third preferred embodiment of the disclosure.

FIG. 4 shows a propulsion assembly 10' according to a third embodiment of the disclosure, in which the turbine engine is a turboprop 12' and generally comprises a propeller 30' and a core 26' for example including an intermediate pressure compressor 110, a high pressure compressor 112, a combustion chamber 114, a high pressure turbine 116, an intermediate pressure turbine 118 and a low pressure turbine 120. The propeller 30' is coupled to a reduction device 122 that is itself coupled to a rotor shaft 124 of the intermediate pressure compressor 110.

The core 26' of the turboprop is surrounded by a fairing device 48' comprising an outer annular wall 50' that provides fairing around the propulsion assembly, and an inner annular wall 52' that surrounds a flow channel directing the core air flow 25 supplying the turboprop core 26'. The outer annular wall 50' and the inner annular wall 52' together delimit an internal compartment 54'.

The outer annular wall 50' is provided with an air inlet orifice 56', and an air exhaust orifice 58' arranged on the downstream side of the air inlet orifice 56' diametrically opposite it.

Furthermore, an accessory control box 36' is housed in the internal compartment 54'.

In a manner similar to that described above, the propulsion assembly 10' comprises a fan 100' housed in the internal compartment 54' so as to generate a ventilation air flow 46' by forced convection.

In the example shown, the fan 100' is similar to the fan 100 in FIG. 3, and is also coupled to a gear 89' of the accessory gear box 36'.

Therefore operation of the fan 100' is similar to operation of the fan 100 disclosed above.

The disclosure according to this third embodiment thus has the same advantages as those disclosed above with reference to the second embodiment.

The invention claimed is:

1. A propulsion assembly for an aircraft, the propulsion assembly comprising:
   a turbine engine comprising a rotor;
   an accessory gear box comprising at least one gear mechanically coupled to the rotor;
   a fairing device comprising an outer annular wall and an inner annular wall that together delimit an internal compartment fitted with an air inlet orifice and an air exhaust orifice, wherein both the air inlet orifice and the air exhaust orifice are formed in the outer annular wall on opposite sides thereof so that an entirety of the internal compartment is ventilated, the opposing sides being defined with respect to a longitudinal axis of the propulsion assembly;
   at least one fan unit housed in the internal compartment, the at least one fan unit comprising a fan propeller; and
   a clutch for coupling and uncoupling the fan propeller and the gear.

2. The propulsion assembly according to claim 1, wherein the clutch is connected in a disengageable manner to a first shaft, which is fixed in rotation to the fan propeller, and a second shaft, which is fixed in rotation to the gear of the accessory gear box.

3. The propulsion assembly according to claim 1, wherein:
   the turbine engine is a double flow turbojet,
   the outer annular wall forms an external fairing of the turbine engine, and
   the inner annular wall delimits an annular channel for a bypass air flow of the turbine engine.

4. The propulsion assembly according to claim 3, wherein the internal compartment is located axially between an air intake and a thrust inverter forming part of the fairing device.

5. The propulsion assembly according to claim 1, wherein:
   the turbine engine is a double flow turbojet,
   the outer annular wall delimits an annular flow channel for a bypass air flow of the turbine engine, and
   the inner annular wall delimits a core of the turbine engine.

6. The propulsion assembly according to claim 1, wherein:
   the turbine engine is a single flow turbojet or an open rotor turbine engine or a turboprop,
   the outer annular wall forms an external fairing of the turbine engine,
   the inner annular wall delimits a core of the turbine engine.

7. The propulsion assembly according to claim 1, comprising a controller configured to electronically control the clutch.

8. The propulsion assembly according to claim 7, comprising a sensor configured to measure a temperature of air within the internal compartment and to provide a result of a measurement of the sensor to the controller, wherein the control unit is configured to receive information about a rotation speed of the rotor to the controller, wherein the controller is configured such that the fan propeller and the gear of the accessory gear box are uncoupled when the temperature measured by the sensor is less than a predetermined temperature threshold and the rotation speed of the rotor is greater than a predetermined speed threshold, and wherein the controller is configured such that the fan propeller and the gear are coupled when the temperature measured by the sensor is greater than the predetermined temperature threshold or the rotation speed of the rotor is less than the predetermined speed threshold.

9. The propulsion assembly according to claim 7, wherein the propulsion assembly is configured to provide information about a rotation speed of the rotor to the controller, wherein the controller is configured such that the fan propeller and the gear of the accessory gear box are uncoupled when the rotation speed of the rotor is greater than a predetermined speed threshold, and such that the fan propeller and the gear are coupled when the rotation speed of the rotor is less than the predetermined speed threshold.

10. The propulsion assembly according to claim 7, comprising a sensor configured to measure a temperature of air within the internal compartment and to provide a result of a measurement of the sensor to the controller, wherein the controller is configured to receive information about a rotation speed of the rotor, wherein the controller is configured such that the fan propeller and the gear of the accessory gear box are uncoupled when the temperature measured by the sensor is less than a predetermined temperature threshold and the rotation speed of the rotor is greater than a predetermined speed threshold, and wherein the controller is configured such that the fan propeller and the gear are coupled when the temperature measured by the sensor is greater than the predetermined temperature threshold or the rotation speed of the rotor is less than the predetermined speed threshold.

11. An aircraft comprising at least one propulsion assembly according to claim 1.

12. A method of ventilating an internal compartment in a fairing device of a propulsion assembly according to claim 1, the method comprising:

coupling the fan propeller and the gear such that the gear drives the fan propeller to generate a ventilation air flow, and uncoupling the fan propeller and the gear such that the gear no longer drives the fan propeller.

13. The propulsion assembly according to claim 2, wherein the clutch is an electromagnetic clutch.

14. A propulsion assembly for an aircraft, the propulsion assembly comprising:

a turbine engine comprising a rotor;

an accessory gear box comprising at least one gear mechanically coupled to the rotor;

a fairing device comprising an outer annular wall and an inner annular wall that together delimit an internal compartment fitted with an air inlet orifice and an air exhaust orifice, wherein both the air inlet orifice and the air exhaust orifice are formed in the outer annular wall;

an internal fairing device with a second air inlet orifice and a second air exhaust orifice arranged on an outer surface thereof for ventilating an interior of the internal fairing device, wherein the second air inlet orifice and the second air exhaust orifice are arranged on opposing sides of the internal fairing device so that an entirety of the interior thereof is ventilated, the opposing sides being defined with respect to a longitudinal axis of the propulsion assembly;

at least one fan unit housed in the internal compartment, the at least one fan unit comprising a fan propeller; and a clutch for coupling and uncoupling the fan propeller and the gear.

15. An aircraft comprising at least one propulsion assembly according to claim 14.

* * * * *